PRIVATE BRANCH EXCHANGE TELEPHONE SYSTEM

Filed Aug. 1, 1960 5 Sheets-Sheet 1

INVENTORS H. H. ABBOTT
C. R. MARTIN
R. A. PREVITE
H. J. WALSH
J. G. WALSH
BY J. R. McCorkendale
ATTORNEY

INVENTORS H.H. ABBOTT
C.R. MARTIN
R.A. PREVITE
H.J. WALSH
J.G. WALSH

BY J.R. McCotterwale
ATTORNEY

April 23, 1963 H. H. ABBOTT ETAL 3,087,025

PRIVATE BRANCH EXCHANGE TELEPHONE SYSTEM

Filed Aug. 1, 1960 5 Sheets-Sheet 3

INVENTORS. H. H. ABBOTT
C. R. MARTIN
R. A. PREVITE
H. J. WALSH
J. G. WALSH

BY F. R. McCorkendale

ATTORNEY

PRIVATE BRANCH EXCHANGE TELEPHONE SYSTEM

Filed Aug. 1, 1960 5 Sheets-Sheet 4

INVENTORS H. H. ABBOTT
C. R. MARTIN
R. A. PREVITE
H. J. WALSH
J. G. WALSH
BY J. A. McCorkendale
ATTORNEY April 23, 1963 H. H. ABBOTT ETAL 3,087,025

PRIVATE BRANCH EXCHANGE TELEPHONE SYSTEM

Filed Aug. 1, 1960 5 Sheets-Sheet 5

INVENTORS H. H. ABBOTT
C. R. MARTIN
R. A. PREVITE
H. J. WALSH
J. G. WALSH

BY J. A. McCorkendale

ATTORNEY

United States Patent Office 3,087,025
Patented Apr. 23, 1963

3,087,025

PRIVATE BRANCH EXCHANGE TELEPHONE SYSTEM

Henry H. Abbott, Chatham, and Charles R. Martin, Basking Ridge, N.J., Richard A. Previte, Brooklyn, and Henry J. Walsh, New York, N.Y., and John G. Walsh, Murray Hill, N.J., assignors to Bell Telephone Laboratories, Incorporated, New York, N.Y., a corporation of New York Filed Aug. 1, 1960, Ser. No. 46,597
10 Claims. (Cl. 179—42)

Figures 1, 6:
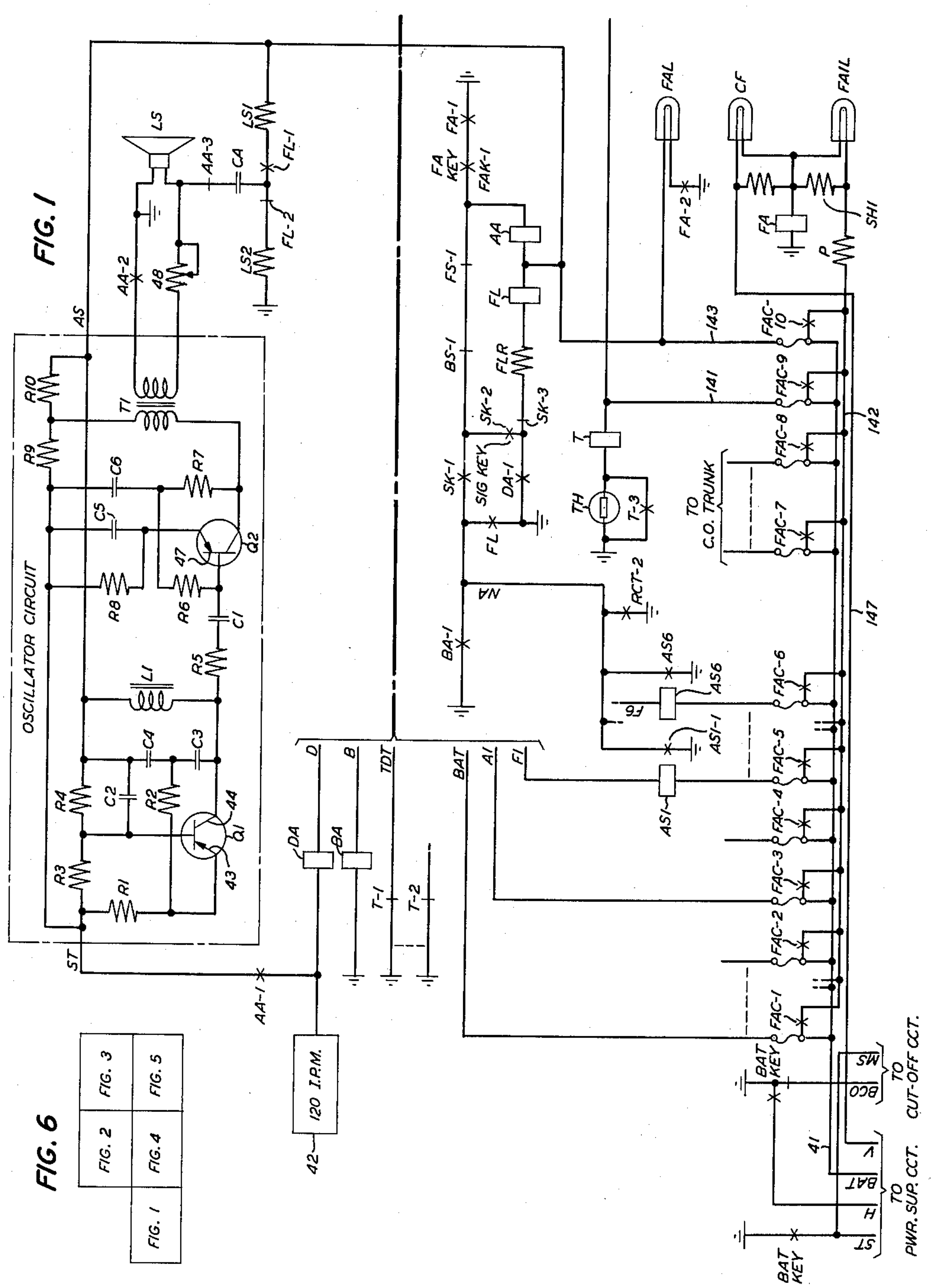

This invention relates to a telephone system and more particularly to a private branch exchange telephone system.

In instances were a telephone customer, for example, a business firm, a hotel, or the like, requires a relatively large number of extensions, it is, of course, the usual practice to provide on the premises a private branch exchange, commonly referred to as a "PBX" or a "PBX switchboard." The PBX, at least if it is of the manual type, is operated during normal business hours, by an attendant or "PBX operator" and functions essentially as a small central office. That is, intra-station calls between extensions on the premises are completed through the PBX as well as calls from the extensions to subscribers served through remote central offices and calls from such subscribers to extensions served by the PBX.

In the usual type of manual PBX each position is normally provided with a number of pairs of plug-ended cords, each pair comprising a "front" cord and a "back" cord. In the normal course of events a back cord is used in answering a call and the front cord of the same pair is used in extending the call. The front and back cords of each pair are normally connected by the associated cord circuit; associated with each cord circuit are, normally, a front and back supervisory lamp, a talk key, battery supplies, ringing sources and so on.

A so-called position circuit is normally provided at each position, the attendant's telephone circuit usually being connected to the position circuit. The cord circuits are selectively seized by the attendant and connected to her position circuit by operation of the respective talk keys. It will be apparent that there is a continuous cooperative action between the position circuit and the plurality of cord circuits provided at the position, and that any steps effective in furthering this cooperative action will be very valuable in the PBX art. Also, since there is only one position circuit for a plurality of cord circuits, it will be apparent that it will be highly advantageous to accomplish as many of the common functions as possible in the position circuit in order to permit simplification of the larger number of cord circuits.

Accordingly, it is an object of the present invention to improve the operation and performance of PBX switchboards.

A more specific object of the invention is to improve the cooperative functioning of a position circuit and a plurality of associated cord circuits in a PBX.

In accordance with a specific embodiment of the invention a plurality of pairs of cords, for example, sixteen pairs, and one position circuit are provided at each position. A "Talk" key is provided for each cord circuit; operation of a talk key will under normal conditions connect the associated cord circuit to the position circuit. Certain marginal sleeve detection relays are included in the position circuit which are effective to determine the sleeve condition of either or both the front cord and the back cord of the cord circuit connected to the position circuit at the moment, that is whether the particular front or back cord is connected to an extension of the PBX, a tie trunk, or a central office trunk. In other words, the marginal relays operate selectively in accordance with the "class" of the line to which the cord circuit and position circuit are connected at the moment. The connection of direct-current bridges, battery supplies and other conditions is then dependent upon the operation or non-operation of the respective marginal relays. A source of automatic or "machine" ringing is normally associated with the front cord of each pair, since this is the cord normally utilized for extending calls, but this source may be disconnected and replaced by manual ringing on occasion.

A feature of the invention is means effective to trip the machine ringing normally applied to the front cord of each pair as manual ringing is applied thereto.

A further feature of the invention is means associated with the Talk key circuits effective to prevent connection of more than one cord circuit to the position circuit at the same time and to release the previously connected cord therefrom when the Talk key associated with a cord that either precedes or succeeds the connected cord is operated.

A still further feature of the invention is means in the form of "memory" leads over which the position circuit is immediately informed of the cord circuit conditions when the attendant makes a subsequent connection to the already "plugged-up" cord circuit.

An additional feature of the invention is means for assuring a relatively short "plug interval," that is the period between tripping ringing and the connection of the attendant's telephone circuit to the cord circuit.

Figure 2:
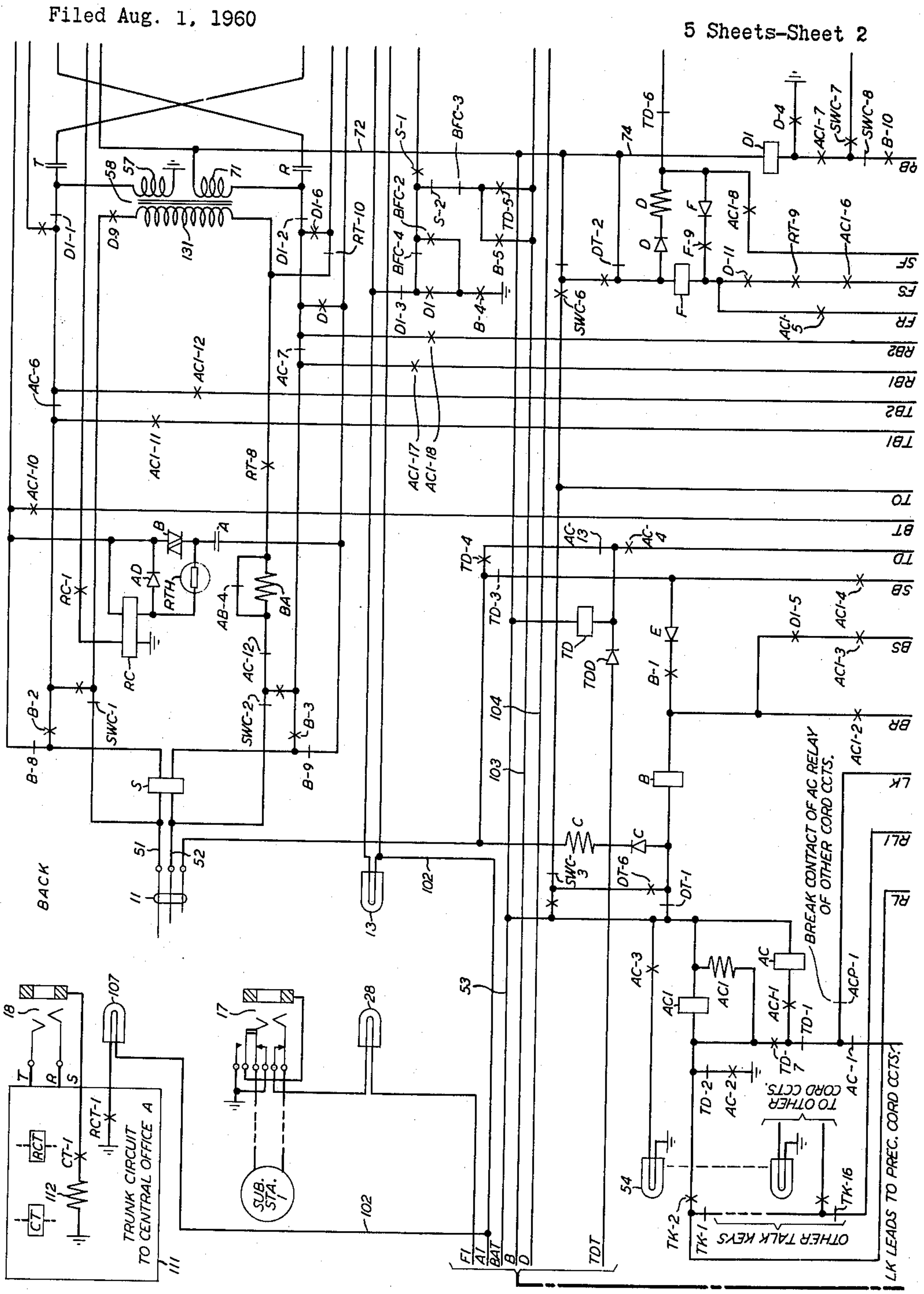
Figure 3:
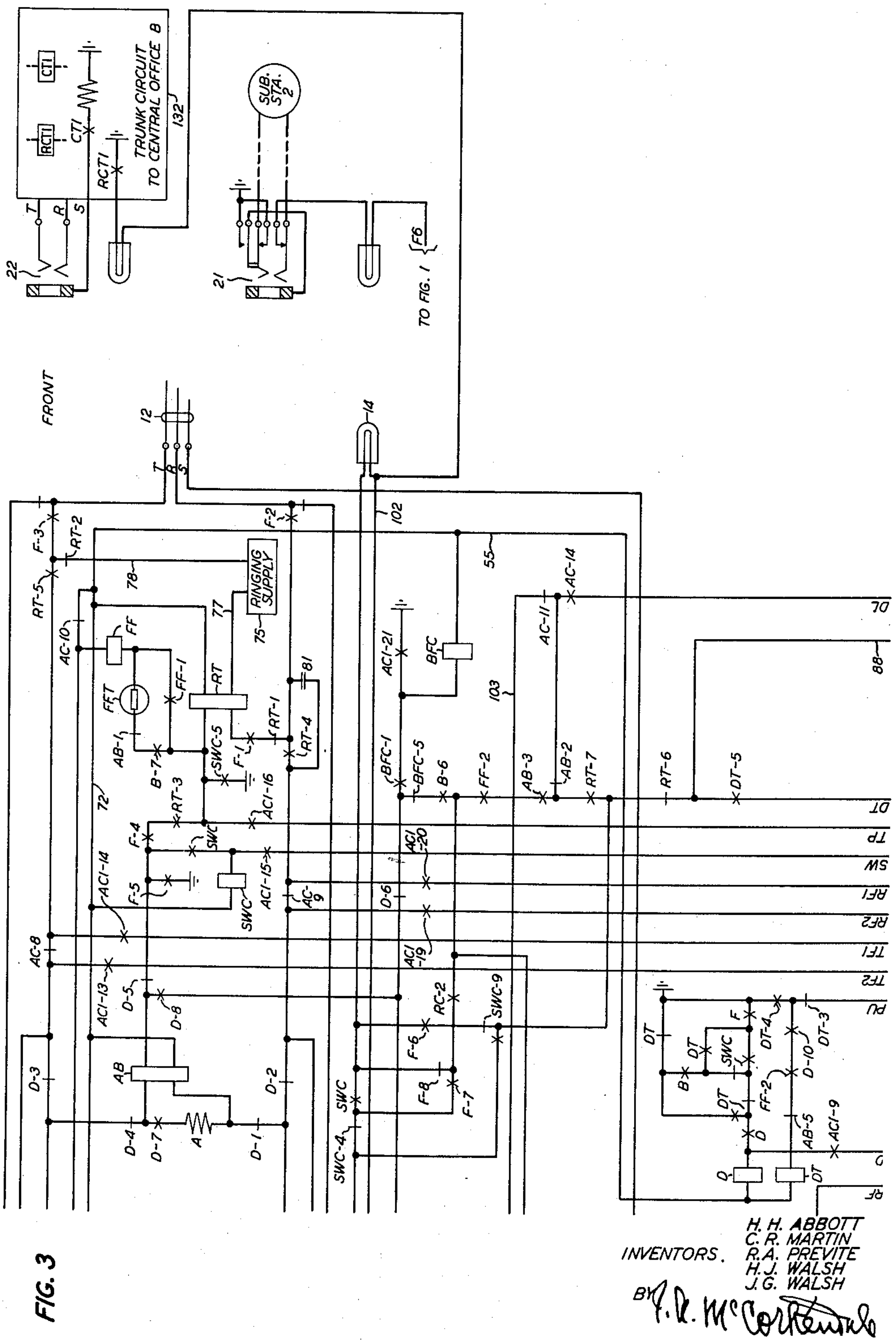
Figure 4:
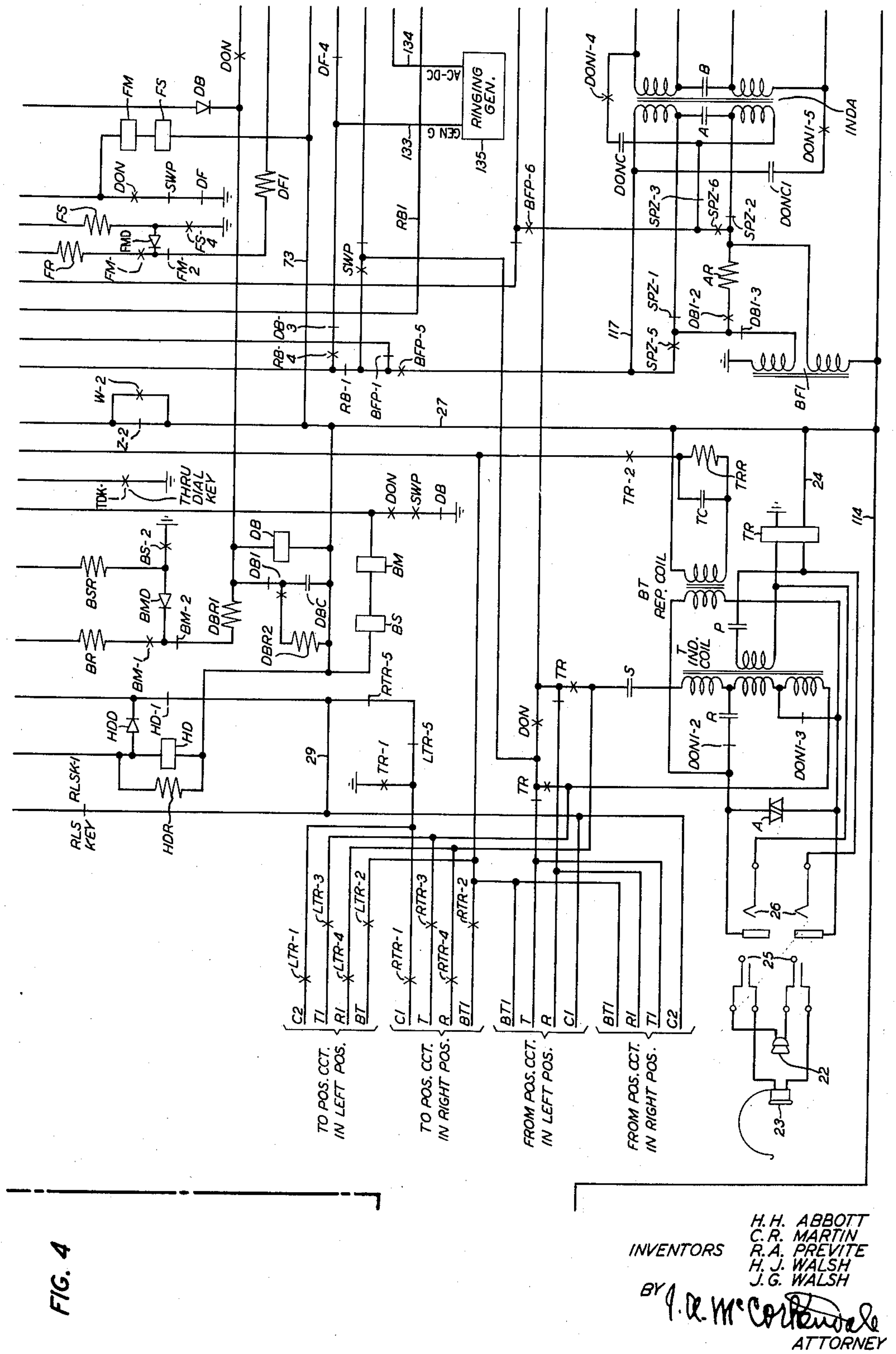
Figure 5:
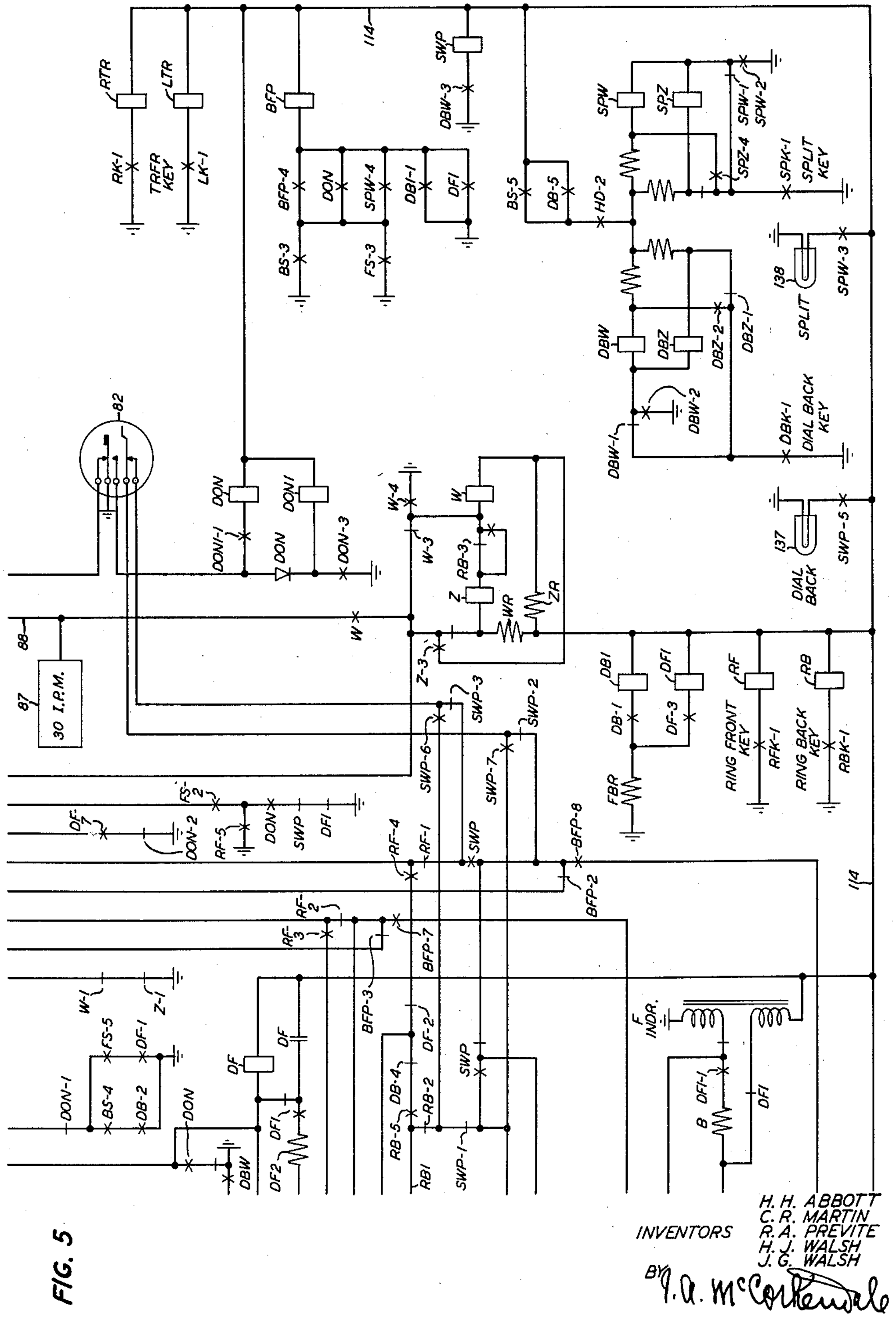

A full understanding of the arrangement contemplated by the present invention as well as an appreciation of the various advantageous features thereof may be gained from consideration of the following detailed description in connection with the accompanying drawing, in which:

FIG. 1 shows the tone oscillator, auxiliary signal, and fuse alarm circuit for use with one specific illustrative embodiment of the invention;

FIGS. 2 and 3 taken together show the cord circuits of this specific illustrative embodiment;

FIGS. 4 and 5 taken together show the position circuit of this specific illustrative embodiment; and FIG. 6 indicates the manner in which FIGS. 1 to 5 should be arranged to show the complete circuit arrangement of this illustrative embodiment.

In order to avoid undue duplication, with resulting complication of the drawing, only one cord circuit has been completely illustrated in conjunction with the one position circuit; as pointed out above, in an actual installation, a plurality of cord circuits, for example sixteen, are provided and served by the one position circuit. The single cord circuit illustrated includes the "back cord" portion terminating in "back" plug 11 (FIG. 2) and the "front cord" portion terminating in "front" plug 12 (FIG. 3). Back cord supervisory lamp 13 is associated with plug 11 and front cord supervisory lamp 14 is associated with plug 12. As previously stated above the back cord of the PBX is normally utilized for answering incoming calls and the front cord for extending the call. Thus, as indicated schematically, plug 11 may be inserted in jack 17 for answering a call originating at the PBX extension Subscriber's Station No. 1, or inserted in jack 18 in answering a call incoming over a trunk from Central Office A. Similarly, plug 12 may be inserted in jack 21 in extending a call to the PBX extension Subscriber's Station No. 2 or inserted in jack 22 in extending a call over a trunk to Central Office B. In accordance with normal PBX practice the sleeve resistance of the particular circuit with which either plug is connected is "sensed," in a manner to be described in detail subsequently, in order to determine whether the connection is to a station line or a trunk, since in the first instance talking and supervisory battery is supplied by the cord circuit while in the second instance the battery is supplied over the central office trunk. Principally involved in this sensing procedure are marginal relays BM and BS for the back cord and marginal relays FM and FS (FIG. 4) for the front cord.

It is believed that the various different features of the arrangement contemplated by the invention can best be described by following the operation of the circuits in connection with the completion and supervision of a number of imaginary calls. It will be assumed that the attendant connects her telephone set, which includes transmitter 22 and receiver 23 (FIG. 4), to the position circuit by inserting her telephone set twin plug 25 in jack 26; this completes an operating path for relay TR traced from battery on lead 24 (FIG. 1), lower winding of relay TR, through transmitter 22 and upper winding of relay TR to ground, jack 26 and plug 25 being included in this path.

Operation of relay TR connects ground at its TR–1 make contact (FIG. 4) and through break contact LTR–5 of relay LTR and break contact RTR–5 of relay RTR over leads 29 and RL to the cord circuit (FIG. 2), and, assuming no Talk keys are operated, passes through break contact TK–1 of the indicated Talk key, through Talk key contacts of other cord circuits (only one such Talk key contact, TK–16, being shown), and back to the position circuit (FIG. 4) over lead RL1, through the operating winding of relay HD to battery on lead 27, relay HD operating over this path. The ground on the RL1 lead is returned through the HDD diode and over the LK lead to the cord circuit. Whenever a Talk key is operated the holding ground for the HD relay is removed at a break contact corresponding to break contacts TK–1 and TK–16 and the HD relay releases. When the HD relay releases the ground is then connected to lead LK at break contact HD–1 of relay HD. Relay HD is made slow-to-release by the connection of resistor HDR in shunt to its operating winding.

*Call Initiated by Extension*

Let us assume now that the PBX subscriber at Subscriber's Station No. 1 initiates a call by removing his handset. This action closes the line at the substation and lights line lamp 28 over a path from ground, upper break contact of jack 17, over the line loop, lower break contact of jack 17, lamp 28, lead F1 to the auxiliary signal and fuse alarm circuit (FIG. 1), winding of relay AS1 (FIG. 1) to battery on lead 41, relay AS1 operating over this path. (It will be understood that other relays, similar to relay AS1, are provided for the other extensions; only one such relay is shown however, namely, relay AS6 which is associated with Subscriber's Station No. 2.)

The line lamp 28 lights at this time to attract the attention of the attendant and, also, in accordance with the arrangement disclosed herein, and further disclosed and claimed in United States Patent 3,037,086, issued May 29, 1962 on the H. H. Abbott, C. R. Martin, J. G. Walsh application Serial No. 46,594, filed August 1, 1960, entitled, Private Branch Exchange Telephone System, an audible alerting signal is produced at the same time in the following manner. Relay AS1 operated completes a path from ground, make contact AS1–1 of relay AS1, NA lead, make contact SK–1 of Signal Key (assumed to be operated i.e., in the "ON" or closed position), break contact BS–1 of relay BS and break contact FS–1 of relay FS, operating winding of relay AA to battery on battery lead 41, relay AA operating over this path.

Relay AA, operated, completes a circuit at make contact AA–1 for application of interrupted ground (120 IPM) from source 42 over lead ST to the transistor oscillator circuit whereby to set the oscillator into operation. Operation of the AA relay also closes the loudspeaker loop at make contact AA–2.

The oscillator circuit comprises a first Colpitts oscillator stage, which includes transistor Q1, and a second amplifier stage, which includes transistor Q2. The 120 IPM impulses applied over lead ST set the oscillator circuit into operation; the characteristics of the components are so selected that the voltage between emitter 43 and collector 44 of transistor Q1, is approximately 1 volt, with the emitter positive to sustain oscillation. Resistors R1, R3 and R4 provide the proper emitter, base and collector voltages on transistor Q1, while the parallel tank circuit, comprising capacitors C3 and C4 and inductor L1, determines the frequency of oscillation. Resistor R2 and capacitor C2 are feedback couplers, while resistor R5 and capacitor C1 act as the signal coupler to the amplifier stage.

In the second stage, the signal coupled thereto through resistor R5 and capacitor C1 is applied to base 47 of transistor Q2. Resistors R9 and R10 provide the proper emitter and collector voltages for transistor Q2; resistors R6 and R7 and capacitor C6 comprise the temperature compensating stabilizer. Resistor R8 and stabilizing capacitor C5 are provided in the emitter voltage supply path and transformer T1 couples the amplified half-wave signal to the loudspeaker LS.

Therefore, as line lamp 28 is lighted as above described to alert the attendant to the incoming call from Subscriber's Station No. 1, a tone is also produced by the loudspeaker, the volume of which can be readily adjusted to the desired level by operation of variable resistor 48. The attendant, alerted to the call, will respond by inserting plug 11 of a back cord into line jack 17, thereby connecting the tip 51 and ring 52 of the cord circuit to the corresponding tip and ring of the line loop and, at the same time opening the previously traced path for lighting line lamp 28 and operating relay AS1 to start the tone. The line lamp is therefore extinguished and the tone is discontinued.

After plugging in on the call the attendant operates the Talk key associated with the particular cord selected. The make contacts TK–2 and break contacts TK–1 of such a Talk key are shown in FIG. 2 and for purposes of further description it will be assumed that this particular Talk key, which is a non-locking key, has been operated.

Operation of the Talk key closes at its make contact TK–2 a path for operation of relay AC1, traced from ground, make contact TR–1 of relay TR (FIG. 4), break contacts LTR–5 of relay LTR and RTR–5 of relay RTR, over RL lead, make contact TK–2 of the Talk key, winding of relay AC1 to battery on lead 53, relay AC1 operating over this path.

Operation of relay AC1 completes an operating path for relay AC traced from ground, make contact TR–1 of relay TR, break contacts LTR–5, RTR–5 and HD–1 of relays LTR, RTR and HD, lead LK, break contacts of AC relays of other cord circuits, assuming that no other cord circuit is connected to the position circuit at the moment, (representative contact ACP–1 being shown), break contact TD–1 of relay TD, make contact AC1–1 of relay AC1, winding of relay AC to battery on lead 53; relay AC operates over this path.

Relay AC operated completes a holding path for relay AC1 traced from ground, make contact AC–2 of relay AC, break contact TD–2 of relay TD, winding of relay AC1 to battery on lead 53; and also completes an energizing path for lamp 54 traced from ground, lamp 54, make contact AC–3 of relay AC to battery on lead 53. Lamp 54 is associated with the Talk key previously referred to and by its illuminated condition indicates that the particular Talk key has been operated.

Operation of relay AC also opens at its break contact AC–1, and at similar break contacts (not shown), the paths over the LK leads to the other cord circuits; this prevents the connection of more than one cord circuit to the position circuit at any one time in a manner further described in the patent referred to above.

Also the operation of relay AC and AC1 completes the necessary connections of certain leads between the position circuit and the selected cord circuit; these connections are completed, for example, at respective make contacts AC1–2, AC1–3, AC1–4, AC1–5, AC1–6, AC1–7, AC1–8; AC1–9, AC1–10, AC1–11, AC1–12, AC1–13, AC1–14, AC1–15, AC1–16, AC1–17, AC1–18, AC1–19 and AC1–20 of relay AC1, and make contacts AC–4 and AC–14 of relay AC. The sleeve circuit is now connected over the SB lead (through make contact AC1–4 of relay AC1) to the position circuit for recognition. It will be noted, also, that at this time relay BFC (FIG. 3) operates over a path from ground, make contact AC1–21 of relay AC1, winding of relay BFC, to battery on lead 55; the function of relay BFC will be described subsequently.

Since as stated above the call has been initiated at an extension of the PBX, conditions should now be established whereby battery will be supplied from the PBX rather than from the central office as would have been the case had the call originated by way of a central office trunk. (This latter condition will be described subsequently.) In the type of connection to be described, ground will be found on the sleeve; if the connection is to a tie trunk, for example, this ground may be of the order of 130 ohms while, in the connection illustrated, it will be noted that, in the plugged-in condition, a "zero ohm" or direct ground is connected to the sleeve at the upper make contact of line jack 17; with this condition both marginal relay BM and sensitive relay BS (FIG. 4) operate over the path from ground on sleeve of jack 17 and plug 11, break contact TD–3 of relay TD, make contact AC1–4 of relay AC1, operating windings of relays BM and BS to battery on lead 27.

With BM and BS relays both operated, ground is connected through make contact BS–2 of relay BS, diode BMD, make contact BM–1 of relay BM, make contact AC1–2 of relay AC1, winding of relay B, break contact DT–1 of relay DT to battery on lead 53. Relay B operates over this path and locks through its make contact B–1, diode E, and break contact TD–3 of relay TD to the sleeve ground. The diode E prevents a return ground over lead SB which would falsely operate the marginal position circuit relays.

At this point, that is after operation of relay B, talking battery is supplied to the calling extension, Subscriber's Station No. 1, over a circuit traced from ground, winding 57 of inductor 58 (FIG. 2), break contact D1–1 of relay D1, make contact AC1–12 of relay AC1, lead TB2, break contacts BFP–1 of relay BFP and RB–1 of relay RB, lead TB1, make contact AC1–11 of relay AC1, make contact B–2 of relay B, upper winding of relay S, through the line loop of Subscriber's Station No. 1, lower winding of relay S, make contact B–3 of relay B, make contact AC1–17 of relay AC1, lead RB1, break contact RB–2 of relay RB and break contact SWP–1 of relay SWP, lead RB2, make contact AC1–18 of relay AC1, break contact D1–2 of relay D1, winding 71 of inductor 58 to battery on lead 72.

Assuming for the moment that the attendant learned upon answering the call that the PBX extension Subscriber's Station No. 2 was being called, she would insert plug 12 of the front cord in jack 21. The direct ground now applied to the sleeve circuit from upper make contact of jack 21 over lead SF (through break contact TD–6 of relay TD and make contact AC1–8 of relay AC1) and through the operating windings of marginal relay FM and sensitive relay FS to battery on lead 73 causes operation of these relays, similarly to the operation of the back cord relays BM and BS (FIG. 4).

Relays FM and FS operated complete an operating path for relay F traced from ground, make contact FS–4 of relay FS, diode FMD, make contact FM–1 of relay FM, lead FR, make contact AC1–5 of relay AC1, winding of relay F, break contact DT–2 of relay DT to battery on lead 74; relay F operates over this path.

At this time automatic machine ringing is applied over the line to the called extension from source 75 (not shown) over a path including lead 77, lower winding of relay RT, make contact F–1 of relay F, break contact RT–1 of relay RT, make contact F–2 of relay F, ring side of line, ringer at Subscriber's Station No. 2, tip side of line, make contact F–3 of relay F, break contact RT–2 of relay RT, and back over lead 78 to the ringing supply. A portion of the ringing supply is fed back through capacitor 81 as "ringing tone" to the calling extension.

Ringing continues until the subscriber at Station No. 2 responds by removing his handset thereby closing the line loop; relay RT thereupon operates on the superimposed direct current and locks operated on a path from battery on lead 55, upper winding and make contact RT–3 of relay RT, make contacts F–4 and F–S of relay F to ground.

Relay RT operated removes the ringing current from the line at its break contacts RT–1 and RT–2. Also, upon operation of relay RT, talking battery is supplied over the line to extension Subscriber's Station No. 2 over a path from battery on lead 72, lower winding of relay AB, break contacts D–1 and D–2 of relay D, make contact AC1–19 of relay AC1, lead RF2, break contact BFP–2 of relay BFP, break contact SWP–2 of relay SWP, lower break contacts of dial 82, break contact SWP–3 of relay SWP, break contact RF–1 of relay RF, lead RF1, make contact AC1–20 of relay AC1, make contact RT–4 of relay RT, make contact F–2 of relay F, through the ring lead, the line loop, back over the tip lead, make contact F–3 of relay F make contact RT–5 of relay RT, make contact AC1–14 of relay AC1, lead TF1, break contacts RF–2 of relay RF and BFP–3 of relay BFP, lead TF2, make contact AC1–13 of relay AC1, break contacts D–3 and D–4 of relay D, upper winding of relay AB, break contact D–5 of relay D, make contact F–5 of relay F to ground. Relay AB operates over this path.

During the time ringing is being applied over the front cord, that is prior to "answer," the "front" supervisory lamp 14 will flash at 30 IPM; the circuit operations involved being as follows. Interrupted ground (30 IPM) is applied from source 87 (included in power supply circuit, FIG. 5) over lead 88, break contact RT–6 of relay RT, break contact SWC–9 of relay SWC, make contact F–6 of relay F, through lamp 14 and over leads 102 and A1 to battery on lead 41 of the auxiliary signal circuit (FIG. 1). (It is noted that, at this time, the tone oscillator is not operated.) Lamp 14 flashes or "winks" at 30 IPM over this path until the call is answered at which point operation of relay RT interrupts the path at break contact RT–6 and the lamp is extinguished, The attendant may disconnect from the cord pair any time after machine ringing starts, either by operating her "release" key which opens lead RL at break contact RLSK–1 (FIG. 4), or by operating the Talk key of another cord pair. When the attendant releases, relays AC and AC1 release; since as pointed out above, relay AC, operated, provided a holding ground for relay AC1, it follows in the present sequence that the AC relay releases before the AC1. This assures that lead TB1 is closed to lead TB2 at break contact AC–6 of relay AC, lead RB1 is closed to lead RB2 at break contact AC–7 of relay AC, lead TF2 is closed to lead TF1 at break contact AC–8 of relay AC and lead RF2 is closed to lead RF1 at break contact AC–9 of relay AC, all before the same pairs of leads are opened to the position circuit at make contacts of relay AC1 when that relay releases. This assures that the battery and ground supply paths to the connected stations will not be opened with resulting receiver "click."

When relay AC releases Talk key lamp 54 is extinguished since the energizing path is interrupted at make contact AC–3 of relay AC.

As already indicated to some extent above, and as will become more fully apparent from the subsequent description, the novel combined visual and audible signaling arrangement disclosed, and which is further disclosed and claimed in United States Patent 3,037,086, issued May 29, 1962 on the application H. H. Abbott, C. R. Martin, J. G. Walsh Serial No. 46,594, filed August 1, 1960, entitled, Private Branch Exchange Telephone System, is based largely upon the following premises During the time the attendant is away from the board and her attention is occupied by other office duties, a tone signal, adjustable in volume, should be provided in conjunction with incoming calls, disconnects, and recalls, in order to redirect her attention to the board upon such occurrences. During the time the attendant is actually directing her immediate attention to the board, however, it is considered unnecessary to provide an audible signal in connection with incoming calls, since she is constantly alert to the visual indications thereof, nor to disconnects since she is also alert, although perhaps to a lesser degree, to visual disconnect signals, and also since there is a lesser need for immediate action in connection with disconnects. However, even though the attendant is at the board, it is considered desirable to provide an audible alerting signal, albeit of a relatively subdued nature (specifically a "click") in connection with "recalls" since such occurrences should have immediate response and, also, since the "flashing" visual signal may itself escape immediate notice. Accordingly, the simple Signal Key referred to above is provided which is ordinarily placed in the "on" or closed position when the attendant is to be away from the board and moved to the "off" or open position when the attendant is at the board. The resulting conditions are as follows:

| Signal Key | Incoming Call | Disconnect | Recall |
|---|---|---|---|
| On | Tone | Tone | Tone. |
| Off | No Signal | No Signal | Click. |

During the time Subscriber's Stations No. 1 and No. 2 are connected through the cord circuit and after the attendant has released, there are several instances where the attention of the attendant should be redirected to the cord circuit. One such situation, for example, occurs when either subscriber, while still connected, "flashes" his switchhook to recall the operator (flashing recall), and another when one or both subscribers "disconnects" by replacing his handset in the cradle. In the first case the supervisory lamp associated with the cord connected to the station will flash and an audible flashing recall signal is heard and in the second instance the lamp will be lighted steadily. As fully described above the type of audible signal, if any, which accompanies the disconnect and recall conditions is determined by the position of the Signal Key (FIG. 1).

Let it be assumed, first, that the subscriber at Station No. 1, desiring to recall the attendant, flashes his switchhook. The first depression of the switchhook opens the line loop at the station and releases relay S; this in turn releases relay BFC (FIG. 3) which, after operating following the operation of relay AC1 as previously described, had been held operated from battery on lead 55, winding of relay BFC, make contact BFC–1 of relay BFC, break contact D–6 of relay D, make contact S–1 of relay S, make contact BFC–2 of relay BFC, make contact B–4 of relay B to ground.

The preoperation or presetting of relay BFC in anticipation of a possible "recall" during the connection is an important factor in achieving a simple and efficient flashing recall feature in the disclosed system.

When relay BFC releases back cord lamp 13 is lighted and relay BA (FIG. 1) is operated over a path from ground on lead B (FIG. 1) through winding of relay BA, lead 103 (FIG. 2), make contact B–5 of relay B, break contact BFC–3 of relay BFC, break contact S–2 of relay S, break contact BFC–4 of relay BFC, break contact D1–3 of relay D1, through back cord lamp 13, leads 102 and A1 to battery on lead 41 (FIG. 1). If the switchhook remains depressed permanently ("Hang-up") the back lamp remains lighted and indicates a disconnect on the back cord; also, at this time an audible alerting tone would be produced through operation of relay BA in a manner described subsequently.

Assuming, however, that the switchhook is again released, i.e., the subscriber is "flashing," relay S will reoperate over the closed line loop and interrupted ground (120 IPM), will be applied from source 42 (FIG. 1) through winding of relay DA, leads D and 104, make contact B–6 of relay B, break contact BFC–5 of relay BFC, break contact D–6 of relay D, make contact S–1 of relay S, break contact BFC–4 of relay BFC, break contact D1–3 of relay D1, lamp 13, lead 102 to battery on lead 41 (FIG. 1); lamp 13 will flash at 120 IPM to attract the attention of the attendant and relay DA will operate for a purpose subsequently described.

As mentioned above, it is desirable under certain circumstances that the above described visual signals, steady for "disconnect" and flashing for "recall," be accompanied by an audible alerting signal. Such a signal easily controlled in volume, is provided by the disclosed arrangement.

First, with regard to the initial depression of the switchhook and assuming it is a "hang-up" or disconnect, it will be recalled that relay BA (FIG. 1) operates at this time. Relay BA operated connects ground through its make contact BA–1, make contact SK–1 of the signaling key (assumed to be in operated or "on" position), break contacts BS–1 and FS–1 of position circuit relays BS and FS, winding of relay AA, to battery on lead 41; relay AA operates over this path. Operation of relay AA connects at its make contact AA–1 interrupted ground (120 IPM from source 42) to the ST lead of the oscillator thereby setting the oscillator into operation and producing a tone through loudspeaker LS as previously described.

In the event of a flashing recall situation, it usually is the wish of the attendant that the alerting signal be of a nature differing from, and readily distinguishable from, the tone signal accompanying a disconnect signal for example. Also, as pointed out above, the flashing recall alerting signal is usually utilized when the attendant is at the switchboard while the tone signal previously described is ordinarily relied upon for alerting or "calling" the attendant when she is away from the board in connection with her other office tasks. For the flashing recall signal the Signal Key (FIG. 1) is moved to the "OFF" or "open" position. It will be recalled that when the subscriber "flashed," relay DA operates at 120 IPM (FIG. 1). With the signaling key in the open position, ground is supplied through make contact DA–1 of relay DA, break contacts SK–3 of the signaling key, resistor FLR, winding of relay FL to battery on lead 143, relay FL operating at 120 IPM over this path. Loudspeaker LS "clicks" immediately from battery on lead 143, through resistor LS1, make contact FL–1 of relay FL, capacitor CA and break contact AA–3 of relay AA as the capacitor charges to the 48-volt level. The LS1 resistor is a current limiting device which also adjusts the time constant of the charging capacitor. Capacitor CA, having charged fully, silences the loudspeaker since the voltage level is no longer rising.

The loudspeaker again clicks immediately during the discharge of capacitor CA through break contact FL–2 of relay FL (operating at 120 IPM) and resistor LS2 to ground. Resistor LS2 is also a current limiting and time-constant adjusting device. The capacitor having discharged silences the loudspeaker. This alternate clicking signal continues so long as relay DA is operated from the 120 IPM source 42 or until the Talk key associated with the connected cord circuit is operated by the attendant.

It may transpire that, on occasions when the 120 IPM ground is being applied to flash either front lamp 14 or back lamp 13 for purposes other than "flashing recall," or even on certain occasions of flashing recall, it be desirable that the accompanying audible alerting signal be the tone produced by the oscillator rather than the click produced by capacitor charge and discharge as when the attendant is away from the switchboard. In such event the signalling key would be left in "on" position and, upon operation of the DA relay as previously described, the ground would be applied through make contact DA–1 of relay DA (FIG. 1), make contact SK–2 of signaling key, break contacts BS–1 and FS–1 of relays BS and FS, winding of relay AA to battery on lead 41, relay AA operating over this path. Relay AA operated applies interrupted ground (120 IPM) at its make contact AA–1 to lead ST of the oscillator. The oscillator is set into operation to produce a tone in loudspeaker LS as described in detail previously in connection with the indication of an incoming call from Subscriber's Station No. 1.

It will be apparent, therefore, that the disclosed arrangement provides an alerting tone and an alerting click signal either of which may be selected by operation of the signaling key. Further, the volume of the tone can be readily adjusted to suit the ambient conditions by operation of volume control 48.

It is desirable, of course, in the above described instances that the audible tone be discontinued as soon as the attendant responds, and, in accordance with a novel feature of the arrangement contemplated by the present invention, the audible tone is automatically discontinued when the attendant operates the Talk key associated with a plugged-in cord. It will be recalled from the above description of the operation of relay AA (following the operation of relay BA on a disconnect signal, or the operation of relay DA with the signaling key in the "on" position) that the operating path of relay AA includes as series elements break contacts BS–1 and FS–1 of respective relays BS and FS. It will be recalled, further, from the above description of the initiation of a call that relay BS operates when the associated back cord is plugged in and the associated Talk key is operated; the corresponding relay FS of the front cord operates in a similar manner. It follows therefore, that regardless of whether a front cord or a back cord is involved, operation of the associated Talk key by the attendant will interrupt the operating path for relay AA at either break contact BS–1 of relay BS or break contact FS–1 of relay FS dependent upon whether a front cord or a back cord is involved. The tone will be automatically discontinued therefore as soon as the attendant responds to the signal by operation of the Talk key.

The "flashing recall" described above originated at Subscriber's Station No. 1, i.e., over the back cord and it is obvious, of course, that a disconnect or recall may also originate at Subscriber's Station No. 2 over the front cord. Assuming therefore, that the switchhook at Subscriber's Station No. 2 is depressed, an "on hook" signal at the "front" station opens the line loop and relay AB releases. With relay AB released, a circuit is completed from the battery on lead 55, break contact AC–10 of relay AC, winding of relay FF, thermistor FFT, break contact AB–1 of relay AB, make contact B–7 of relay B, make contact RT–3 of relay RT, make contacts F–4 and F–5 of relay F to ground; after a heating period, say five seconds, of thermistor FFT relay FF operates over this path. This slow-operate characteristic of relay FF is provided in order to prevent the operation thereof by mere momentary release of relay AB such as might be caused by accidental "flicks" of the switchhook resulting, for example, from handset "fumbling" when answering a call. Relay FF upon operating locks through its make contact FF–1 and over the path just traced through make contacts RT–3, F–4 and F–5 to ground. At this point ground is connected through the winding of relay BA (FIG. 1) over leads B and 103, break contact AC–11 of relay AC, break contact AB–2 of relay AB, make contact RT-7 of relay RT, break contact SWC–9 of relay SWC, make contact F–6 of relay F, through the front lamp 14 to battery on lead 102; lamp 14 lights "steady" over this path and relay BA operates to start the oscillator tone as described above.

If this condition prevails, that is if the hookswitch of Station No. 2 remains depressed, lamp 14 is lighted "solid" to indicate "disconnect." However, if Station No. 2 again goes "off hook" that is if the hookswitch is "flashed," relay AB again operates, since the line loop is restored at Station No. 2, and interrupted ground (120 IPM) is applied through the winding of relay DA (FIG. 1) over leads D and 104, make contact FF–2 of relay FF, make contact AB–3 of relay AB, make contact RT–7 of relay RT, break contact SWC–9 of relay SWC, make contact F–6 of relay F, through front lamp 14, lead 102 to battery on lead 41; lamp 14 flashes at 120 IPM to indicate "recall" and relay DA operates to initiate the accompanying audible signal as described above, oscillator tone if the signaling key is operated to "on" and capacitor click if the signaling key is relased.

Once relay FF has operated, therefore, we have an established path for lamp 14; a "steady" path through break contacts of relay AB while the receiver is "on hook" and a "flashing" path through make contacts of relay FF if the station again goes "off hook" and relay AB reoperates.

*Call Received Over Central Office Trunk*

For purposes of further description let us assume now that an incoming call is received at the PBX over a trunk circuit, schematically represented by box 111, from Central Office A. The trunk circuit which may be any one of many types of standard trunk circuits well known in the art, is not disclosed in detail, and its operation will be described only to the extent necessary to describe the PBX circuits of the present invention. When ringing current is applied to the trunk circuit at Central Office A, relay RCT (circuit not shown in detail) will operate in the usual manner; this completes an obvious path, which includes make contact RCT–1, for lighting trunk lamp 107 thus indicating to the PBX attendant that there is an incoming call over trunk circuit 111. Operation of relay RCT also applies ground through its make contact RCT–2 to lead NA (FIG. 1). Application of ground to lead NA, assuming that the signal key is in closed position, results in production of the oscillator tone signal by loudspeaker LS in the same manner as that described above in connection with the description of a call incoming from the PBX extension Supscriber's Station No. 1.

The attendant responds to the lighted trunk lamp 107 and the accompanying audible tone by operating the Talk key associated with an idle cord circuit (assumed to be that illustrated in FIGS. 2 and 3) and inserting plug 11 of the front cord in trunk jack 18. At this point (through operation of circuits inherent in the trunk circuit and not disclosed in detail here) relay CT operates followed by release of relay RCT. Release of relay RCT interrupts the lamp and tone paths, and operation of relay CT connects, at its make contact CT–1, resistor 112 to the sleeve of jack 18 and plug 11; resistor 112 is of relatively high ohmage, for example of the order of 3800 ohms.

Operation of the Talk key results in operation of relays AC and AC1 and the connection of the selected cord circuit to the position circuit as described above in connection with the description of the call initiated from the extension Subscriber's Station No. 1.

It will be recalled that when the sleeve circuit was established in the instance of the extension initiated call, we had a "low" or direct ground on the sleeve, and that, with this condition, both sensitive relay BS and marginal relay BM operated. In the present connection we find a "high sleeve," i.e., a 3800-ohm ground, connected to the sleeve and under this condition only sensitive relay BS operates and marginal relay BM remains unoperated (operating path from ground, resistor 112, sleeve of jack 18 and plug 11, break contact TD-3 of relay TD, make contact AC1-4 of relay AC1, windings of relays BM and BS in series to battery on lead 27).

BS relay, operated, connects a high resistance ground through its make contact BS-2 and resistor BSR to lead BS, and completes a path from ground, make contact BS-2 of relay BS, diode BMD, break contact BM-2 of relay BM, resistor DBR1, winding of relay DB to battery on lead 27, relay DB operating over this path. The operating winding of relay DB is shunted by capacitor DBC; the effect of capacitor DBC and resistor DBR1 is to slow the operation of relay DB. This is necessary, because of the slow operation of relay BM, to assure nonoperation of relay DB on low sleeve condition. The DBR2 resistor is provided for discharging the shunting capacitor DBC whereby to assure proper release of relay DB.

Relay DB operating after approximately 150 milliseconds completes an operating path for relay DB1 (FIG. 5) traced from ground, resistor FBR, make contact DB-1 of relay DB, winding of relay DB1 to battery on lead 114, relay DB1 operating over this path. Operation of relay DB1 results in operation of relay BFP over a path from ground, make contact DB1-1 of relay DB1, winding of relay BFP to battery on lead 114; relay BFP on operating locks over a path from ground, make contact BS-3 of relay BS, make contact BFP-4 and winding of relay BFP to battery on lead 114. Relay DB operated places a ground on the D lead to the cord circuit through its make contact DB-2, make contact BS-4 of relay BS, break contact DON-1 of relay DON, make contact AC1-9 relay AC1, winding of relay D to battery on lead 55; relay D operates over this path.

Since as stated above the present call is coming in from a central office and since battery is supplied from the central office, a so-called "dry bridge" should be applied at the PBX. This is done over leads TB1 and RB1, being traced from the tip side 51, make contact B-2 of relay B, make contact AC1-11 of relay AC1, break contact RB-1 of relay RB, make contact BFP-5 of relay BFP, lead 117, upper left winding of repeat coil INDA, break contact SPZ-1 of relay SPZ, make contact DB1-2 of relay DB1, resistor AR, break contact SPZ-2 of relay SPZ, lower left winding of repeat coil INDA, break contact SPZ-3 of relay SPZ, make contact BFP-6 of relay BFP, break contact SWP-1 (FIG. 5) of relay SWP, break contact RB-2 of relay RB, lead RB1, make contact AC1-17 of relay AC1, make contact B-3 of relay B, ring lead 52 to trunk. (Relay B is operated at this time as described in the next paragraph.)

Relay D, operated as above described, operates relay D1 (FIG. 2) over a path from ground, make contact D-4 of relay D, winding of relay D1 to battery on lead 74. Relay D1 operated removes at its break contacts D1-1 and D1-2 the local battery feed bridge from the back cord, operates relay B over a path from ground, make contact BS-2 (FIG. 4) of relay BS, BS lead, make contact AC1-3 of relay AC1, make contact D1-5 of relay D1, winding of relay B, break contact DT-1 of relay DT to battery on lead 53.

Relay D1 and relay D, both operated, place relay AB (FIG. 3) under control of relay S, over a path from battery on lead 72 (FIG. 2), lower winding of relay AB, make contact D-7 of relay D, upper winding of relay AB, make contact D-8 of relay D, make contact S-1 of relay S, make contact BFC-2 of relay BFC, make contact B-4 of relay B to ground.

Assuming that, as before, the "called" party is Subscriber's Station No. 2, the attendant will extend the call by connecting plug 12 of the front cord in jack 21 as above described, machine ringing starting automatically as before. When ringing is tripped by station answer and after the attendant has disconnected from the cord, the cord circuit "cuts through" directly from back plug to front plug so that talking battery is furnished to the extension station from the central office.

During the connection Subscriber's Station No. 2 can recall the attendant by "flashing"; front lamp 14 flashes at 120 IPM, accompanied by an audible signal as above described. During the connection a high resistance bridge, which is, for example of the order of 1350 ohms and which comprises, as series elements, resistor BA and winding 131 of repeat coil 58, is connected in parallel with the central office loop over a path from tip 51, break contact SWC-1 of relay SWC, make contact D-9 of relay D, winding 131 (which may, for example, have a resistance of 350 ohms), make contact RT-8 of relay RT, resistor BA (which may, for example, have a resistance of 1000 ohms), break contact AC-12 of relay AC, break contact SWC-2 of relay SWC, to ring 52.

Assuming now that Subscriber's Station No. 2 goes "on hook," relay S, which was held operated over the closed station loop, releases. Relay S upon releasing opens at its S-1 make contact the previously traced operating path for relay AB and relay AB thereupon releases. Relay AB upon releasing completes at its break contact AB-4 a path which shunts resistor BA out of the high resistance bridge circuit previously traced, leaving the resistance represented by winding 131 (for example 350 ohms) to hold the central office trunk 111. The release of the AB relay also completes at its AB-1 break contact a path (previously described above) over which relay FF operates after completion of the heating period of thermistor FFT. With relay AB released and relays FF and D operated, relay DT is connected through break contact AB-5 of relay AB, make contact FF-2 of relay FF, make contact D-10 of relay D and break contact DT-3 of relay DT to the PU lead of the position circuit. Ground is connected to the PU lead when both relays W and Z are released through break contacts W-1 and Z-1. Connection of ground to lead PU operates relay DT over the path just traced, through the winding of relay DT to battery on lead 55. Relay DT upon operating locks in operated condition through its make contact DT-4 to ground and connects interrupted ground (30 IPM from source 87) through its make contact DT-5 over lead DT to the position circuit to start the timing interval. Relay DT operated also disconnects, at its DT-1 break contact, battery from the winding of relay B and connects the same side of the winding of relay B through make contact DT-6 of relay DT and break contact SWC-3 of relay SWC to lead TO of the position; lead TO is connected to battery on lead 27 when relay Z is released (break contact Z-2), or when relay W is operated (make contact W-2).

During the first grounded interval over lead DT, relay W (FIG. 5) operates through its W-3 break contact and winding, resistor ZR to battery on lead 114; relay W upon operating locks to ground through its make contact W-4. Relay Z is short-circuited by this ground and remains unoperated; this short circuit is removed upon the following open interval on lead DT. Relay Z operates on the silent interval from battery on lead 114, resistor WR, winding of relay Z, break contact RB-3 of relay RB, make contact W-4 of relay W to ground. When the next ground pulse occurs on lead DT, relay W is short-circuited at make contact Z-3 of relay Z and releases. At this point, i.e., with relay Z operated and relay W released, battery is removed from lead TO thereby releasing relay B.

Relay B released removes at its B-2 and B-3 make contacts the cord circuit central office holding bridge causing the central office to release the trunk. The next open interval in lead DT permits relay Z to release thereby ending the timing cycle. The maximum time of the cycle between the station disconnect and the opening of the cord circuit holding bridge may be of the order of 5.75 seconds.

A dry bridge, as above, is provided for a front cord connected to a central office trunk, (as trunk 132), with the exceptions that the SWC relay would be operated and that the F relay would release to remove the holding bridge.

After the PBX subscriber at Subscriber's Station No. 2 has disconnected and the cord circuit has functioned to release trunk circuit 111, it may, of course happen that the central office will reseize trunk 111 for another call to the PBX before the attendant has removed plug 11 from jack 18. In such instance the central office ringing current applied over tip 51 and ring 52 will operate relay RC over a path which includes break contact B–8 of relay B, right-hand winding of relay RC, thermistor RTH, and break contact B–9 of relay B; relay RC operates over this path after the heating period of thermistor RTH which may be, for example, of the order of one-half second. The provision of the thermistor prevents the operation of relay RC on short surges of current such as those which may occur on disconnect or pulsing while Thru dialing. Diode AD shunts the operating winding of relay RC on one-half of each ringing current cycle so that the relay will operate on every other half cycle.

Relay RC upon operating locks on a path from ground, left-hand winding of relay RC, make contact RC–1 of relay RC, break contact AC–10 of relay AC to battery on lead 55. Relay RC operated completes a path from 120 IPM interrupted ground source 42 (FIG. 1), through winding of relay DA, leads D and 104, make contact RC–2 of relay RC, make contact F–7 of relay F, break contact SWC–4 of relay SWC, back lamp 13, to battery on lead 102; lamp 13 flashes at 120 IPM over this path and operation of relay DA initiates an accompanying audible tone in the manner previously described. (In the instance just described had the trunk circuit been connected to the front cord, the energizing path would have been through break contact F–8 of relay F to front lamp 14 rather than through make contact F–7 of relay F and break contact SWC–4 of relay SWC to back lamp 13.)

The central office ringing current is not extended to the station still connected to the front cord and is tripped when the attendant operates the Talk key to reconnect the position circuit to this cord pair.

It will be apparent from the preceding description and drawings that the cord circuit is substantially symmetrical with regard to "front cord" and "back cord," and that, while the description has been devoted largely to calls answered by the back cord and extended by the front cord, "reverse" operation is carried out, when in order, in substantially the same manner. However, there are a few minor differences which will be described subsequently.

With regard to ringing it was pointed out above that, when a call is being extended over the front cord to an extention of the PBX, automatic machine ringing is applied as soon as plug 12 is inserted in jack 21. However, in the event the front cord is connected to a jack with a "high sleeve," i.e., in the arrangement illustrated, jack 22 of central office trunk 132, machine ringing is not required and will in fact be tripped by operation of relay RT; operation of relay RT results as follows. As previously described in connection with back cord operation, the presence of a high ground on sleeve lead SF causes operation of sensitive relay FS. Operation of relay FS applies ground through its FS–4 make contact to lead FS and also through diode FMD and break contact FM–2 of relay FM through the winding of relay DF to battery on lead 114. Upon operation of relay DF ground is also applied to lead D through make contacts DF–1 of relay DF and FS–2 of relay FS, break contact DON–1 of relay DON, make contact AC1–9 of relay AC1, winding of relay D to battery on lead 55, relay D operating over this path. D relay operated operates relay D1 over a path from ground, make contact D–4 of relay D, winding of relay D1 to battery on lead 74. Relay D1 operated removes the battery feed bridge from the front end of the cord as previously described. Operation of relay DF also completes an operating path over lead SW for relay SWC traced from ground, break contact DON–2 of relay DON, make contact DF–7 of relay DF, make contact AC1–15 of relay AC1, winding of relay SWC to battery on lead 72; operation of relay SWC completes at its make contact SWC–5 an obvious operating path for relay RT which operates to trip the machine ringing as above mentioned.

With relays RT and D operated a path is now completed from the ground on the FS lead, make contact FS–4 of relay FS, make contact AC1–6 of relay AC1, make contact RT–9 of relay RT, make contact D–11 of relay D, winding of relay F, break contact DT–2 of relay DT to battery on lead 53; relay F operates over this path and locks through its make contact F–9 to the sleeve ground.

*Plug Interval*

In the instance of calls received at the PBX over a trunk circuit, as described above, the term "Plug Interval" is used to designate the period between the tripping of the ringing and the actual connection of the attendant's telephone circuit to the cord circuit for conversation with the connected party. Once the ringing has been tripped the calling party no longer receives ring-back tone, and unless the call is actually answered without undue delay, the party may well assume that the call has encountered difficulty and may, therefore, hang up and start the call anew. This, of course, results in unnecessary use of the central office equipment, and, in order to reduce the frequency of such occurrences, it is desirable to reduce the plug interval period.

In the use of PBX circuits previously known in the art where the ringing has been tripped merely by the attendant plugging-in on the call, the plug interval has often been extended unnecessarily, particularly when the board has been busy, by failure of the attendant to actually answer the call promptly after plugging-in. (Plugging-in promptly without actually answering is effective to give the appearance of a prompt answer to any monitoring operator but as stated above, leaves the calling party without ring-back.) In the instance of the novel arrangement contemplated by the present invention ringing is not tripped by plugging in on the call alone but only after the associated Talk key has been operated. The plug interval period is negligible; actually the operating time of the cord and position relays.

For further illustration of the novel arrangement of the invention, let us assume that the attendant responds to a call incoming on the trunk circuit from central office A merely by inserting plug 11 into jack 18 but does not operate the associated Talk key. This action will extinguish lamp 107 and discontinue the tone in the manner described above, but it will be noted that, since the Talk key has not been operated with consequent operation of the position circuit relays, the direct-current tripping path for the central office ringing has not been established and the ringing will not be tripped. Ringing current received over the trunk tip and ring, therefore, operates relay RC over a path from tip 51, break contact B–8 of relay B, right-hand winding of relay RC, thermistor RTH, capacitor A, break contact B–9 of relay B to ring 52; relay RC, upon operating, locks from ground on its left-hand winding, its make contact RC–1, break contact AC–10 of relay AC, lead 72 to battery of lead 53. Operation of relay RC completes a path from interrupted ground (120 IPM) source 42 (FIG. 1), winding of relay DA, leads D and 104, make contact RC–2 of relay RC, break contact F–8 of relay F, front lamp 14, leads 102 and A1 to battery on lead 41 (FIG. 1); lamp 14 flashes at 120 IPM and, assuming Signal Key is operated to "ON," tone will be produced by the loudspeaker LS in the manner previously described.

Operation of the associated Talk key by the attendant opens the holding circuit of relay RC at break contact AC–10 of relay AC with consequent interruption of the lamp and tone energization path; establishment of the direct-current tripping path in the position circuit as previously described after connection of the cord thereto trips the central office ringing.

It is apparent, therefore, that in accordance with the arrangement of the invention, ringing is tripped only when the attendant actually operates her Talk key and comes in on the call and that the calling party receives ring-back tone right up to this time. The period of plug interval is substantially nil.

*Manual Ringing*

On occasion it may be desirable to apply ringing current, manually controlled by the attendant, over either the front or the back cord. Under certain of these circumstances it may be necessary also to operate the RT relay to remove the automatic machine ringing since a tripping bridge is not provided in all of the types of circuits to which the PBX may be connected. For the purpose of applying and controlling manual ringing two keys, "Ring Front" and "Ring Back," are provided the operation of which will now be described.

Assuming first that it is desired to apply manually controlled ringing current over the front cord connected to a "low ground" sleeve, i.e., for example to the PBX extension Subscriber's Station No. 2; in this situation, as previously described, the tip and ring leads to the station are connected to the position circuit of the PBX over leads TF1 and RF1 respectively, this connection including the central office holding bridge traced from lead TF1, break contact RF–2 of relay RF, make contact BFP–7 of relay BFP, upper right winding of repeat coil INDA, make contact DF1–1 of relay DF1 (operated over a path from ground, resistor FBR, make contact DF–3 of relay DF, winding of relay DF1 to battery on lead 114), lower right winding of the repeat coil, make contact BFP–8 of relay BFP, break contact SWP–2 of relay SWP, lower break contacts of calling dial 82, break contact SWP–3 of relay SWP, break contact RF–1 of relay RF to lead RF1.

The attendant now depresses the non-locking Ring Front key (FIG. 5) which operates relay RF over a path from ground, make contact RFK–1 of the key, winding of relay RF to battery on lead 114; relay RF holds operated as long as the key is depressed. Operation of relay RF connects the ground side lead 133 from ringing generator 135 (FIG. 4) through break contact DF–4 of relay DF and make contact RF–3 of relay RF to lead TF1 and connects the AC—DC lead 134 from the generator through break contact DF–2 of relay DF and make contact RF–4 of relay RF to lead RF1; the ringing current is applied over respective leads TF1 and RF1 to the tip and ring conductor of the line and thence to the station.

Operation of the RF relay also connects ground through its RF–5 make contact and make contact FS–2 of relay FS over TP lead, make contact AC1–16 of relay AC1, upper winding of relay RT to battery on lead 55; in accordance with the novel arrangement contemplated by the invention, relay RT operates, to remove the automatic machine ringing from the line, and locks in operated position from the battery on lead 55, upper winding and make contact RT–3 of relay RT and make contacts F–4 and F–5 of relay F to ground. The circuit (except relay RT) is restored to normal when the Ring Front key is released.

Let it be assumed now that the front cord is connected to a central office trunk (as trunk 132) and that it is desired to recall or flash the distant operator. The position circuit is arranged as previously described for this condition, that is the tip and ring leads toward the central office are connected to leads TF1 and RF1 of the position circuit with a central office holding bridge as previously traced, i.e., from lead TF1, break contact RF–2 of relay RF, make contact BFP–7 of relay BFP, upper right winding of repeat coil INDA, make contact DF1–1 of relay DF1, lower right winding of repeat coil, make contact BFP–8 of relay BFP, break contact SWP–2 of relay SWP, lower break contacts of calling dial 82, break contact SWP–3 of relay SWP, break contact RF–1 of relay RF to lead RF1.

Now when the attendant depresses the Ring Front key and operates the RF relay the previously traced central office holding bridge is opened at break contacts RF–2 and RF–1 of relay RF thus opening the loop to the distant central office to signal the distant operator. (The output of the ringing generator is not applied under this condition since relay DF is operated and leads 133 and 134 are open at respective break contacts DF–4 and DF–2.)

Manual ringing on the back cord is accomplished in a manner generally similar to that described above except in this instance the Ring Back key is operated with consequent operation of relay RB over a path from ground, make contact RBK–1 of the key, winding of relay RB to battery on lead 114. Assuming that the back cord is connected to a "low" sleeve, for example to Subscriber's Station No. 1, an extension of the PBX, ground lead 133 of ringing generator 135 is then connected to lead TB1 through break contact DB–3 of relay DB and make contact RB–4 of relay RB to lead TB1 and AC—DC lead 134 of the ringing generator is connected through break contact DB–4 of relay DB and make contact RB–5 of relay RB to lead RB1; ringing is now applied over the line in the manner described above in connection with ringing over the front cord.

In the event the back cord is connected to a central office trunk (high sleeve) operation of the RB relay opens the dry holding bridge and signals the distant operator in a manner similar to that described above in connection with the front cord.

*Dialing by Attendant*

A calling dial 82 is provided as a part of the PBX arrangement and by virtue of the various novel circuit arrangements provided the dial can be utilized by the attendant in transmitting calls over either the front cord or the back cord, the particular circuits being automatically rearranged in certain circumstances in accordance with the type of connection (PBX extension, tie trunk, or the like) with which the opposite end of the cord is associated at the moment. It will be understood that a pushbutton call transmitter or other type of calling device may be utilized instead of the calling dial illustrated.

As previously stated above, the front cord is normally used in extending calls, and, for this reason, the contacts of dial 82 are normally associated with the front cord. Assuming now that we are to dial over plug 12 of the front cord which is connected through trunk circuit 132 to a central office, it will be recalled from the previous description of the holding bridge for this situation that the connection of the bridge to lead RF1 is completed through the lower break, or "pulsing," contacts of dial 82, that is to say the pulsing contacts are in series with the holding bridge. No key operation is required before dialing therefore. When the dial is pulled off normal, relay DON1 operates over a path from ground, upper make contact of dial 82, winding of relay DON1 to battery on lead 114. Relay DON1 operated operates relay DON over a path from the same ground, make contact DON1–1 of relay DON1, winding of relay DON to battery on lead 114. Relay DON1 is now held operated over a path from ground, make contact DON–3 of relay DON, winding of relay DON1 to battery on lead 114. Operation of relay DON1 opens the circuit of the attendant's telephone set at break contacts DON1–2 and DON1–3 (FIG. 4) to eliminate clicks in the receiver and connects at its make contacts DON1–4 and DON1–5 capacitors DONC and DONC1 across the windings of repeat coil INDA in order to absorb clicks. (When the dial returns to normal relays DON and DON1 release reconnecting the attendant's telephone set and removing the capacitor connections from the windings of the repeat coil.)

Let us assume now for purposes of further description that the attendant desires to dial over the back cord which is connected over trunk circuit 111 to a central office. As previously described for this condition the tip and ring leads to the central office are connected over leads TB1 and RB1 and through the previously described holding bridge. The attendant operates the Dial Back key (FIG. 5) to transfer the dial to the back cord which causes operation of relay DBW over a path from ground, make contact DBK–1 of Dial Back key, break contact DBW–1 of relay DBW, winding of relay DBW, make contact HD–2 of relay HD, make contact DB–5 of relay DB to battery on lead 114. Relay DBW operates and locks from ground on its DBW–2 make contact; relay DBZ is short-circuited from ground on the key through its break contact DBZ–1 and remains nonoperated.

When the Dial Back key is released the short-circuiting ground is removed from the winding of relay DBZ which thereupon operates and is held operated from ground, make contact DBW–2 of relay DBW, winding of relay DBZ, make contact HD–2 of relay HD and make contact DB–5 of relay DB to battery on lead 114. Relay DBW operated operates relay SWP (FIG. 5) over a path from ground, make contact DBW–3 of relay DBW, winding of relay SWP to battery on lead 114.

It will be noted at this point that even though the Dial Back key has been released and restored to normal, relays DBW and DBZ remain operated.

Relay SWP operated completes an obvious path through its SWP–5 make contact for energizing Dial Back lamp 137 to indicate the circuit condition, and also connects through its make contacts SWP–6 and SWP–7 the pulsing contacts of calling dial 82 in series with the central office dry holding bridge, this circuit being traced from tip 51 of the line, make contact AC1–11 of relay AC1, break contact RB–1 of relay RB, make contact BFP–5 of relay BFP, lead 117, upper left winding of repeat coil INDA, break contact SPZ–1 of relay SPZ, make contact DB1–2 of relay DB1, resistor AR, break contact SPZ–2 of relay SPZ, lower left winding of repeat coil INDA, break contact SPZ–3 of relay SPZ, make contact BFP–6 of relay BFP, make contact SWP–7 of relay SWP, lower break (pulsing) contacts of calling dial 82, make contacts SWP–6 of relay SWP, break contact RB–2 of relay RB, lead RB1, make contact AC1–17 of relay AC1 and make contact B–3 of relay B to ring side of line.

When the dial is pulled off normal relays DON and DON1 operate as above described and result in circuit changes similar to those previously described.

Dialing to other connections, for example, dialing on the back cord to a tie trunk or on the front cord to a tie trunk, with either a high sleeve or a low sleeve connected to the opposite end of the cord, are accomplished by the novel circuits disclosed in a manner generally similar to that described above.

It will be noted that as described above relays DBW and DBZ after operating remain in operated condition even though the Dial Back key is released. After dialing on the back cord has been completed the attendant may restore the dial to its normal connection to the front cord by a second operation of the Dial Back key which connects ground through key contact DBK–1, through make contact DBZ–2 of relay DBZ and short circuits the winding of relay DBW causing its release. Relay DBW released transfers the holding ground for the operated DBZ relay to the operated Dial Back key (break contact DBW–1). When the Dial Back key is restored, relay DBZ releases. Upon the release of relay DBW, the SWP relay operating circuit is opened at make contacts DBW–3 of the DBW relay and the energizing path of Dial Back lamp 137 interrupted at make contact SWP–5. Relay SWP released, removes the connection of the calling dial 82 (or other signaling device) from the back cord and reconnects it to the front cord. However, the attendant may well omit this second operation of the Dial Back key, particularly if she has no occasion to dial on the front cord at the moment, and the dial-back condition will remain locked in. In the normal course of operating procedures, the attendant will of course cut away from the cord circuit in order to pick up another cord and in such instance it is obviously desirable that any such locked-in conditions in the position circuit be restored to normal before the cord is released and another cord connected thereto. According to a novel feature herein disclosed, and further described and claimed in the copending application J. G. Walsh, Serial No. 46,596, filed August 1, 1960, entitled, Private Branch Exchange Telephone System, the locked-in condition in the position circuit is automatically released and restored to normal when another cord circuit is connected to the position circuit. It will be recalled that the locking paths for relays DBW and DBZ include as series elements make contacts of the HD and DB relays and it will be recalled, further, from the above description of the operation of the Talk keys that, as a Talk key is operated the HD relay releases. It follows, therefore, that as a Talk key associated with a particular cord circuit is operated incidental to connection of that cord circuit to the position circuit and consequent release of the previously connected cord circuit from the position circuit, relay HD will release and interrupt at its make contact HD–2 the holding path for relays DBW and DBZ; these relays will therefore release, releasing in turn relay SWP and restoring calling dial 82 to its normal connection to the front cord. It will be apparent that should relays DB and BS release while relay HD remains operated, the holding path referred to will be interrupted at make contacts DB–5 and BS–5.

*Cord Splitting*

It may become desirable on occasion for the attendant to converse privately with a subscriber connected to the front cord without the conversation being overheard by a subscriber connected to the corresponding back cord. Operation of the Split key splits or separates the cord circuit to permit this at the same time lighting "Split" lamp 138 to indicate the condition. The novel circuit arrangement operates as follows:

Operation of the Split key completes a circuit from ground through its make contact SPK–1, break contact SPW–1 of relay SPW, winding of relay SPW, make contacts HD–2 of relay HD and DB–5 of relay DB to battery on lead 114, relay SPW operating over this path. Upon operating, relay SPW locks from ground through its make contact SPW–2 to battery over the path just traced, and completes through its SPW–3 make contact an obvious path for lighting "Split" lamp 138. Relay SPZ does not operate at this point because of the short-circuiting path. When the Split key is released the short-circuiting ground is removed and relay SPZ operates over a path from ground, make contact SPW–2 of relay SPW, winding of relay SPZ, make contact HD–2 of relay HD, make contact DB–5 of relay DB to battery on lead 114.

Relay SPW operated connects ground from either make contact BS–3 of relay BS or FS–3 of relay FS (whichever is operated) through its make contact SPW–4 and the winding of relay BFP to battery on lead 114, relay BFP operating over this path. Relay BFP upon operating locks from either of the grounds through its make contact BFP–4 to the battery just traced.

Relay BFP operated terminates (through its make contacts BFP–5, BFP–6, BFP–8 and BFP–7) the conductors of the front and back ends of the connected cord pair to opposite windings of the INDA repeat coil. This would normally permit talking between the front and back ends of the cord and the attendant's telephone set. However, the operation of the SPZ relay, as above described, disconnects at its SPZ–1 and SPZ–3 break contacts the windings of the repeat coil from the conductors to the back end of the cord pair thereby preventing transmission between the back end of the cord and the front end of the cord. Transmission between the attendant and the front of the cord is not interfered with. The conductors to the back cord remain terminated by resistor AR if relay DB1 is operated (make contact DB1–2) or by battery feed inductor BF1 if relay DB1 is released (break contact DB1–3). Make contacts SPZ–5 and SPZ–6 are involved in these connections.

In order to restore transmission to the back cord the Split key is again depressed; ground from the key through make contact SPZ–4 of relay SPZ short circuits the winding of relay SPW causing its release. Relay SPW upon release interrupts the energizing path of Split lamp 138 and transfers the holding ground for relay SPZ to the operated Split key. When the Split key is restored, relay SPZ releases and reconnects the conductors from the back end of the cord to the winding of repeat coil INDA. Since the BFP relay is locked under control of the BS and FS relays, talking between the front and back ends of the connected cord is through the repeat coil until the position circuit is released.

It will be noted that the holding paths for the SPW and SPZ relays include as a series element a make contact of the HD relay, as was also the case in the instance of the Dial Back relays DBW and DBZ described above. Here again, therefore, the locked-in condition in the position circuit is automatically released and restored to normal when another cord is connected to the position circuit.

When a central office trunk, as trunk 111, having been seized by the attendant, is "held" while other traffic is being handled, a resistance bridge comprising the resistance of winding 131 of repeat coil 58 (FIG. 2), which may be of the order of 350 ohms, is provided in the cord to hold the trunk; this bridge circuit is traced from ring 52, make contact B–3 of relay B, break contact AC–7 of relay AC, make contact D1–6 of relay D1, break contact RT–10 of relay RT, winding 131 of repeat coil, make contact D–9 of relay D, break contact SWC–1 of relay SWC to tip 51.

*Through Dialing and Night Connections*

On occasion it may be desirable to set up a so-called through dialing connection over which an extension station, connected, for example, to the back cord can dial through on a "clear" cord without DC shunts connected through the other end of the cord (in this example the front cord), over a trunk circuit to a central office or the trunk. The present system includes a novel circuit arrangement for accomplishing this which is initiated by operation of a Through Dial key.

Also, as is well known, it is the usual practice on the part of the PBX attendant, before leaving the board at the end of the business day, to set up a number of "night connections," i.e., a number of selected extension stations are connected through the board by a corresponding number of cord circuits to selected central office trunks or tie trunks. The PBX battery is turned off and any incoming calls can be completed directly to the particular extension. "Clear" cords for this purpose also are obtained by operation of the Thru Dial key. This arrangement is further described and claimed in United States Patent 3,037,087 issued May 29, 1962 on the application H. H. Abbott, C. R. Martin, O.C. Olsen, R. A. Previte, H. J. Walsh, J. G. Walsh, Serial No. 46,595 filed August 1, 1960, entitled, Private Branch Exchange Telephone System.

Assuming now that PBX extension Subscriber's Station No. 1 is connected through jack 17 and plug 11 to the back cord and that the front cord is connected through plug 12 and jack 22 to central office trunk 132 and thereover to the central office, and further, that it is desirable to obtain a clear cord for dialing or for night connection purposes. Accordingly, the attendant operates the Thru Dial key in the position circuit (FIG. 4) thereby applying ground through its make contact TDK1 to the TD lead; relay TD now operates from ground, make contact AC–4 of relay AC, winding of relay TD to battery on lead 53.

Relay TD operated opens the holding path for relay AC at break contact TD–1 and relay AC releases; relay AC released locks relay TD over a path from battery on lead 53, winding of relay TD, break contact AC–13 of relay AC, make contact TD–4 of relay TD, to ground on the sleeve. Release of relay AC also opens at its AC–2 make contact the holding path for relay AC1 which thereupon releases and disconnects the cord from the position circuit at its several previously described make contacts, as AC1–2, AC1–3, AC1–4, etc.

The station can now dial through on a clear cord to the central office or tie trunk. The attendant can reconnect the position circuit by operating the associated Talk key, this reoperates the AC and AC1 relays reconnecting the cord circuit to the position circuit, and releases the TD relay by opening its holding path at break contact AC–13. The attendant can release the connection by removing the cords from the respective jacks after a disconnect indication.

Cords, "cleared" as above, can be utilized as night connections as previously set forth, and it will be assumed for purposes of further description that a number of such connections are set up and the cords cleared by operation of the Thru Dial key. The attendant then operates the Battery key in the power supply circuit (FIG. 1), which functions through a cut-off circuit (not shown in detail) to shut off the PBX battery supply as well as the 120 IPM source 42; the attendant then leaves the board for the night. When the attendant resumes her duties the following day, she reconnects the PBX battery and prepares to take down the night connections. However, she must of course be able to detect any such connections that are actually in use in a talking connection at the moment so that any such cannections will be left undisturbed until the conversation has been completed. According to the novel arrangement contemplated, a momentary ground is applied to each of the cord circuits when the battery supply is reconnected in the manner and for the purpose now to be described in detail.

When the battery is reconnected, this battery is connected over leads 41 and 141 (FIG. 1) through the winding of relay T and thermistor TH to ground; relay T does not operate immediately, i.e., not until thermistor TH has heated sufficiently to premit passage of the required operating current. In the meantime ground is applied through break contact T–1 (FIG. 1) of relay T over lead TDT to the winding of relay TD (FIG. 2) of the cord circuit illustrated and to battery on lead 53. (It will be understood that ground is applied over other similar break contacts, as T–2, of relay T to the TD relays of the other cord circuits served by the position circuit illustrated.)

Relay TD operates over the path traced, and if the cord is plugged up in a night connection the relay will lock up through break contact AC–13 and its own make contact TD–4 to the sleeve ground to provide normal cord lamp supervision.

After the heating period of thermistor TH has been completed relay T operates, shorting the thermistor at make contact T–3 and opening the ground path to relay TD at break contact T–1 of relay T (and to the TD relays of the other cord circuits at the other break contacts, as T–2). At this point, therefore, all TD relays except those associated with plugged up cords will release.

While the TD relay is operated a circuit is completed from ground, winding of relay BA (FIG. 1), lead SB and 103, make contact TD–5, break contact BFC–3 of relay BFC, break contact S–2 of relay S (under other situations, which will be discussed subsequently, relay S may be operated at this point), break contact BFC–4 of relay BFC, break contact D1–3 of relay D1, through back lamp 13 to battery on lead 102; back lamp 13 lights over this path and, as previously described, operation of relay BA brings in the audible signal.

When relay T operates and relay TD releases (assuming it is not locked up to the sleeve ground on a night connection) lamp 13 is extinguished and the audible signal is discontinued unless actuated on another cord.

If the cord is plugged up on a night connection and relay TD is locked up to the sleeve ground, lamp 13 will remain lighted over the previously traced path (provided relay S is released) until the cord is taken down. However, assuming that the cord is up on a night connection and, further, that it is actually in use on a talking connection at the moment, relay S will then be operated over the closed loop at the extension as previously described. In this situation, even though relay TD operates and is locked up to the sleeve ground, back lamp 13 will not be lighted since the previously traced path is opened at break contact S–2 of relay S so long as the talking connection prevails.

To summarize therefore, when battery is reconnected to restore the PBX to normal daytime service, all back cord lamps will light briefly except those associated with any night connection cords that are actually in use on a talking connection. After operation of the T relay all lighted lamps will be extinguished except those associated with cords plugged in on night connections. The attendant will take down all the night connection cords having lighted lamps but will leave plugged in those cords, if any, the lamps of which are dark. These lamps will light in the usual manner when the subscriber goes on hook and relay S releases over the circuit previously traced, at which point the attendant will take down the cord.

The TDD diode included in the operating path of each TD relay assures that a night connection set up in one cord will not falsely set up a night connection condition on the other cord in the same unit through a multiple.

*Busy Test*

With either the front or back cord of a cord pair about to be used, and the associated Talk key operated, the attendant may test a multiple jack appearance for "busy" by touching the tip of either cord to the sleeve of the multiple jack. If busy the sleeve will have a ground, either high or low, which ground is applied from the tip 51, through break contact B–8 of relay B and make contact AC1–10 of relay AC1, lead BT, make contact TR–2 of relay TR, through resistor TRR (shunted by capacitor TC) right-hand winding of BT repeat coil to battery on lead 114; this causes a potential charge across capacitor TC and resistor TRR which induces a "click" through the BT repeat coil to the attendant's receiver.

*Non-Interference and Memory*

When an attendant attempts to connect a cord circuit, with the Talk key operated, to a multiple jack of a central office trunk by "overplugging," that is connecting to a trunk circuit which already has a cord circuit of the same, or another, position circuit connected to it, the marginal and sensitive relays of the overplugging position circuit will not operate, since they are designed for nonoperate under this condition, and the sleeve relay of the cord circuit included in the established connection will not release. Since the sleeve relays of the overplugging position do not operate, the sleeve relay of the associated cord circuit cannot operate to cut through the tip and ring leads. Therefore, the overplugging attendant cannot interfere with the established connection to a central office trunk circuit.

However, when the attendant answers a recall signal on a connection as above described, she depresses the Talk key in line with the flashing lamp which causes the associated cord circuit to connect to the position circuit. The cord sleeve circuits are, in this case, connected through the operated AC1 relay to the position circuit in parallel with the already operated B and F relays of the cord circuit. As pointed out above, the sleeve relays of the position circuit associated with the end of a cord connected to a central office trunk will not operate in this situation. However, lead RF or lead RB, depending upon which cord is connected to the central office, is connected to ground at this time; ground is connected through make contact D–4 of relay D, make contact AC1–7 of relay AC1, make contact SWC–7 of relay SWC to lead RF if the front end of the cord is connected to a central office, or through make contact D–4 of relay D, make contact AC1–7 of relay AC1, break contact SWC–8 of relay SWC and make contact B–10 of relay B to lead RB if the back end of the cord is the one connected to a central office. The above referred ground on the RF or RB lead signals the position circuit (by operation of the respective DF or DB relays, and with the sensitive and marginal relays unoperated), that one of the plugs of the cord circuit is connected to a central office trunk and, further, indicates which end, i.e., front plug or back plug is so connected by operation or non-operation of relay SWC. (The operating path for relay SWC includes make contact DF–7 of relay DF.) The position circuit is enabled therefore, through the novel circuit arrangement contemplated by the invention, to provide a central office holding bridge (as previously described) on the proper end of the now split cord.

In instances of reconnection as above when both ends of the cord are in use on an established connection between low ground sleeves, the D relay will be released and leads RB, or RF, will not be grounded. Further the position sleeve relays will operate in parallel with the cord sleeve relays on the low ground condition which will prevent the splitting of the cord circuit and thus maintain the battery feed to both ends of the cord.

*Release and Transfer*

The attendant can release from a cord circuit either by operation of another Talk key or by operation of the RLS key provided in the position circuit. Operation of the RLS key opens the RL lead at break contact RLSK–1 of the release key and removes the ground from that lead. The open RL lead releases the HD relay, previously held by the ground through the Talk key chain (break contacts TK–1 and TK–16 included in this path) and releases the AC relay previously held by the ground through diode HDD, release of the AC relay in turn releases the AC1 relay (make contact AC–2) thus disconnecting the cord circuit from the position circuit and extinguishing lamp 54. The attendant can also release by operation of the Thru Dial key as described above.

The attendant's position, under control of the TRFR key, can be used to originate or answer calls in the adjacent left or right position if that position is unattended, that is if another attendant's telephone set is not plugged in. Assuming relay TR of the adjacent position circuit is not operated, operation of relay RTR (FIG. 5), controlled by operation of TRFR key to close contact RK–1, or operation of relay LTR, controlled by operation of TRFR key to close contact LK–1, extends ground from make contact TR–1 of the TR relay of the illustrated position circuit over either make contact LTR–1 of relay LTR to the adjacent left position or over make contact RTR–1 of relay RTR to the adjacent right position, extends the busy test lead BT over either make contact LTR–2 of relay LTR to the adjacent left position or over make contact RTR–2 of relay RTR to the adjacent right position, and, finally, extends the attendant's telephone set over make contacts LTR–3 and LTR–4 of relay LTR to the left adjacent position or over make contacts RTR–3 and RTR–4 of relay RTR to the right adjacent position. The TRFR key must be returned to normal to release relay RTR or LTR before a Talk key can be operated or the position circuit connected to a cord circuit on the same position.

*Fuse Alarm*

Indications, both visible and audible, are provided to the attendant upon occurrence of fuse failures. As indicated schematically in FIG. 1, the fuses utilized (only representative ones of which are illustrated) are of the "indicator" type; that is when a fuse operates or "blows," a contact is made with a bus bar for alarm purposes. Contacts FAC–1 to FAC–10 inclusive are shown in FIG. 1; when the associated fuse blows, contact is made between battery lead 41 and alarm bus 142. An alarm fuse of the general nature utilized in the circuit is shown in United States Patent 817,959 issued April 17, 1906, to E. B. Craft.

Assuming first that the fuse associated with lead 141 (FIG. 1) blows, relay FA will operate from battery on lead 41, contact FAC–9 of the operated fuse, lead 142, lamp FA1L, winding of relay FA to ground, resistor SH1 being connected in parallel with a portion of this path. Relay FA operates, and assuming fuse alarm key FA is in closed position, relay AA is operated from ground, make contact FA–1 of relay FA, make contact FAK–1 of the fuse alarm key, winding of relay AA, lead 143 to battery on lead 41. Relay AA operated connects 120 IPM from source 42 through its AA–1 make contact to the ST lead of the tone oscillator and sets the oscillator into operation to produce the audible tone signal as described above. The tone signal will continue until the FA key is moved to the open position to release relay AA, and disconnect the 120 IPM source 42.

Operation of relay FA as above described also completes at its FA–2 make contact an obvious circuit for operation of lamp FAL which indicates the particular position circuit having a blown fuse.

Assuming that a fuse operates in the power circuit (not shown) relay FA will operate over a path similar to that described above, it being assumed that lead 147 in the power circuit is also equipped with indicator type fuses.

While certain specific embodiments of the invention have been selected for detailed disclosure, the invention is not, of course, limited in its application to the embodiments disclosed. The embodiments which have been described should be taken as illustrative rather than restrictive thereof.

What is claimed is:

1. In a telephone system, a private branch exchange, an attendant's position circuit at said private branch exchange, a first cord circuit at said private branch exchange, a plurality of additional cord circuits at said private branch exchange, a talk key associated with said first cord circuit, operation of said talk key being effective to connect said first cord circuit to said position circuit and to prevent the connection of any of said additional cord circuits to said position circuit while said first cord circuit is connected thereto, a talk key associated with each of said additional cord circuits, and means effective upon operation of any one of said last-mentioned talk keys to disconnect said first cord circuit from said position circuit and to connect the cord circuit associated with the operated one of said last-mentioned talk keys to said position circuit.

2. In a telephone system, a private branch exchange, an attendant's position circuit and a first cord circuit at said private branch exchange, a talk key associated with said first cord circuit, a first relay and a second relay also associated with said first cord circuit, a plurality of additional cord circuits at said private branch exchange, operation of said talk key being effective to operate said first and said second relays, operation of said first relay being effective to connect said first cord circuit to said position circuit and operation of said second relay being effective to prevent the connection of any of said other cord circuits to said position circuit while said first cord circuit is connected thereto, a talk key associated with each of said additional cord circuits, and means effective upon operation of any one of said last-mentioned talk keys to disconnect said first cord circuit from said position circuit and to connect the cord circuit associated with the operated one of said last-mentioned keys to said position circuit.

3. In a telephone system, a private branch exchange, an attendant's position circuit and a plurality of cord circuits at said private branch exchange, a plurality of lines of different respective classes terminating at said private branch exchange, means for connecting a selected one of said cord circuits to one of said lines and to said position circuit, means in said position circuit operating selectively in accordance with the class of said connected line whereby to indicate said class, means for disconnecting said selected cord circuit and said line from said position circuit, means effective upon reconnection of said selected cord circuit and said line to said position circuit to prevent operation of said selectively operating means, and additional means for indicating the class of said line independently of said selectively operating means.

4. In a telephone system, a private branch exchange, an attendant's position circuit and a plurality of cord circuits at said private branch exchange, a first line terminating at said private branch exchange and connected to a central office, additional lines terminating at said private branch exchange and connected to local stations of the private branch exchange, means for connecting selected ones of said cord circuits to selected ones of said lines and to said position circuit, means in said position circuit operating selectively according to the class of the line connected thereto to indicate said class, means effective when the position circuit is connected to a cord circuit already connected to said first line for preventing operation of said selectively operating means, and additional means exclusive of said selectively operating means for indicating that the connected cord circuit is connected to said first line.

5. In a telephone system, a private branch exchange, a plurality of cord circuits and an attendant's position circuit at said private branch exchange, each of said cord circuits being terminated by a front end plug and a back end plug, a first line terminating at said private branch exchange and connected to a remote central office, additional lines terminating at said private branch exchange and connected to local stations of the private branch exchange, means for connecting selected ones of said cord circuits to selected ones of said lines and to said position circuit, means in said position circuit operating selectively according to the class of the line connected thereto to indicate said class, means effective when the position circuit is connected to a cord circuit one terminating plug of which is already connected to said first line for preventing operation of said selectively operating means, and additional means exclusive of said selectively operating means for indicating that one plug of the connected cord circuit is connected to said first line and for indicating, further, whether the front end plug or the back end plug is so connected.

6. In a telephone system, a private branch exchange, a plurality of cord circuits and an attendant's position circuit at said private branch exchange, each of said cord circuits being terminated by a front end plug and a back end plug, a line terminating at said private branch exchange and connected to a subscriber's station, means for connecting the front end plug of a selected one of said cord circuits to said line and to said attendant's position circuit, an automatic machine ringing source, means for connecting said source to said connected front end plug for transmission of ringing current to the subscriber's station, means for disconnecting said source when the line is closed at said subscriber's station, a second source of ringing current, manually controlled means for selectively connecting ringing current from said second source to either said connected front end plug or to said rear end plug, and means effective upon connection of ringing current from said second source to said front end plug for disconnecting said first source from said front end plug.

7. In a telephone system, a private branch exchange, a plurality of cord circuits and an attendant's position circuit at said private branch exchange, each of said cord circuits being terminated by a front end plug and a back end plug, a line terminating at said private branch exchange connected to a subscriber's station, means for connecting the front end plug of a selected one of said cord circuits to said line and to said attendant's position circuit, a first relay in said selected cord circuit, a second relay in said position circuit, an automatic machine ringing source, means for connecting said source to said connected front end plug for transmission of ringing current to the subscriber's station, operation of said first relay being effective to disconnect said source from said connected front plug, means for operating said first relay when the line is closed at said subscriber's station, a second source of ringing current, operation of said second relay being effective to connect ringing current from said second source to said connected front end plug, means in said position circuit for operating said second relay, and means effective upon operation of said second relay for operating said first relay.

8. In a telephone system, a private branch exchange, a plurality of cord circuits and an attendant's position circuit at said private branch exchange, each of said cord circuits being terminated at the respective two ends by a plug, a source of ringing current, a key in said position circuit for controlling the application of ringing current from said source through the position circuits to the respective cord circuits as connected thereto, a line terminating at said private branch exchange and connected to a remote central office, means for connecting a selected one of said cord circuits to said line and to said position circuit and for establishing in said position circuit a bridge circuit for holding the central office connecton, means effective while said bridge circuit is established for preventing the application of ringing current from said source, and means also controlled by said key for opening said central office holding bridge whereby to actuate a signal at said remote central office.

9. In a telephone system, a private branch exchange, a cord circuit and an attendant's position circuit at said private branch exchange, a talk key associated with said cord circuit effective when operated to connect said cord circuit to said position circuit, a line connected to a central office terminating at said private branch exchange, a first visual signal associated with said line at said private branch exchange for indicating an incoming call, a second visual signal associated with said cord circuit, means for applying ringing current to said line from said central office for operating said first visual signal, means for connecting said cord circuit to said line whereby to extinguish said first visual signal, said ringing current being effective after connection of said cord circuit to said line to cause said second visual signal to operate, and means to remove said ringing current from said line whereby to extinguish said second visual signal, said last means being controlled by operation of said talk key to connect said cord circuit to said attendant's position circuit.

10. In a telephone system, a private branch exchange, a cord circuit and an attendant's position circuit at said private branch exchange, a talk key associated with said cord circuit effective when operated to connect said cord circuit to said position circuit, a line connected to a central office terminating at said private branch exchange, a first visual signal associated with said line at said private branch exchange for indicating an incoming call, a second visual signal associated with said cord circuit, means for applying ringing current to said line from said central office for operating said first visual signal, a relay included in said cord circuit, means for connecting said cord circuit to said line whereby to extinguish said first visual signal, said ringing current being effective after connection of said cord circuit to said line to operate said relay, means effective upon operation of said relay to operate said second visual signal, and means to remove said ringing current from said line whereby to release said relay and extinguish said second visual signal, said last-mentioned means being effected by operation of said talk key to connect said cord circuit to said attendant's position circuit.

References Cited in the file of this patent

UNITED STATES PATENTS

| | | |
|---|---|---|
| 1,821,193 | Vinant | Sept. 1, 1931 |
| 1,921,409 | Hinrichsen | Aug. 8, 1933 |
| 2,031,922 | Bonomi | Feb. 25, 1936 |